United States Patent
Wu

(10) Patent No.: US 9,521,404 B2
(45) Date of Patent: Dec. 13, 2016

(54) THREE-DIMENSIONAL DISPLAY CONTROL METHOD AND 3D DISPLAY CONTROL DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 430 days.

(21) Appl. No.: 14/348,267

(22) PCT Filed: Apr. 24, 2013

(86) PCT No.: PCT/CN2013/074650
§ 371 (c)(1),
(2) Date: Mar. 28, 2014

(87) PCT Pub. No.: WO2014/127583
PCT Pub. Date: Aug. 28, 2014

(65) Prior Publication Data
US 2015/0319427 A1 Nov. 5, 2015

(30) Foreign Application Priority Data

Feb. 20, 2013 (CN) .......................... 2013 1 0054687

(51) Int. Cl.
*H04N 13/04* (2006.01)
*G09G 3/36* (2006.01)

(52) U.S. Cl.
CPC ............ *H04N 13/0413* (2013.01); *G09G 3/36* (2013.01); *H04N 13/0409* (2013.01);
(Continued)

(58) Field of Classification Search
None
See application file for complete search history.

(56) References Cited

U.S. PATENT DOCUMENTS

2005/0275942 A1* 12/2005 Hartkop ............ H04N 13/0409
359/464
2008/0088753 A1* 4/2008 Chestak ............... G02B 27/225
349/15
(Continued)

FOREIGN PATENT DOCUMENTS

CN 101907774 A 12/2010
CN 102466915 A 5/2012
(Continued)

OTHER PUBLICATIONS

Korean Office Action dated Jul. 3, 2015; Appln. No. 10-2014-7008297.
(Continued)

Primary Examiner — Robert Bader
(74) Attorney, Agent, or Firm — Ladas & Parry LLP

(57) ABSTRACT

Embodiments of the present invention disclose a three-dimensional (3D) display control method and a 3D display control device. The 3D display control method comprises: sequentially acquiring left-eye image data or right-eye image data corresponding to each column of subpixels on a display panel for displaying a current frame image; and sequentially updating images displayed by each column of subpixels according to the left-eye image data or the right-eye image data for displaying the current frame image, and meanwhile updating light shielding regions and light transmitting regions of a grating device corresponding to a previous frame image, so as to achieve a naked-eye 3D image displaying.

14 Claims, 11 Drawing Sheets

(52) U.S. Cl.
CPC ..... *H04N 13/0486* (2013.01); *H04N 13/0497* (2013.01); *H04N 2213/002* (2013.01)

(56) References Cited

U.S. PATENT DOCUMENTS

| | | | | |
|---|---|---|---|---|
| 2009/0103177 | A1* | 4/2009 | Jang | H04N 13/0497 359/462 |
| 2009/0224646 | A1* | 9/2009 | Kim | G02B 27/2214 313/245 |
| 2009/0309887 | A1* | 12/2009 | Moller | H04N 13/0402 345/522 |

FOREIGN PATENT DOCUMENTS

| | | | |
|---|---|---|---|
| EP | 0744872 | A2 | 11/1996 |
| JP | 2008-083073 | A | 10/2008 |
| KR | 20120119982 | A | 11/2012 |
| KR | 20120122610 | A | 11/2012 |

OTHER PUBLICATIONS

International Preliminary Report on Patentability dated Aug. 25, 2015; PCT/CN2013/074650.
International Search Report dated Nov. 28, 2013; PCT/CN2013/074650.
First Chinese Office Action dated Jun. 30, 2014; Appln. No. 201310054687.2.
Korea Notice of Allowance dated Dec. 16, 2015; Appln. No. 10-2014-7008297.
Second Chinese Office Action Appln. No. 201310054687.2; Dated Jan. 12, 2015.
Korean Office Action Appln. No. 10-2014-7008297; dated Feb. 6, 2015.
Extended European Search Report dated Sep. 28, 2016; Appln. No. 13840130.2-1903/2961163 PCT/CN2013074650.

* cited by examiner 1R 2R 3L 4R 5L 6R 1R 2L 3L 4R 5L 6R 1R  2L  3R  4R  5L  6R 1R  2L  3R  4L  5L  6R 1R 2L 3R 4L 5R 6R 1L 2L 3R 4L 5R 6L 1L 2R 3R 4L 5R 6L 1L 2R 3L 4L 5R 6L 1L 2R 3L 4R 5R 6L 1L 2R 3L 4R 5L 6L

THREE-DIMENSIONAL DISPLAY CONTROL METHOD AND 3D DISPLAY CONTROL DEVICE

TECHNICAL FIELD

Embodiments of the present invention relate to a three-dimensional (3D) display control method and a 3D display control device.

BACKGROUND

With the development of technology, 3D stereoscopic display, particularly naked-eye 3D stereoscopic display, has become one of trends in the displaying field. In the 3D stereoscopic display, by controlling a signal or by using an auxiliary device, a pair of "stereoscopic images" having "binocular parallax" enters a left eye and a right eye of a viewer, and based on a principle of binocular parallax, the viewer can view a 3D stereoscopic image with the 3D effect. As illustrated in FIG. 1a, the basic principle of one kind of naked-eye 3D stereoscopic display is that: at a first moment, light emitted from subpixels 31 of a display panel 30 enter different viewing fields via a grating device 33, and the left eye and the right eye of the viewer are positioned in the different viewing fields, and hence the stereoscopy can be achieved. Moreover, as illustrated in FIG. 1b, at a second moment, grating states of regions of the grating device corresponding to subpixels in odd columns and subpixels in even columns are changed (that is, light shielding regions 33a and light transmitting regions 33b are converted). At this point, due to the visual persistence effect of the human eye, a single eye of the viewer can see images from the subpixels in the odd columns and the subpixels in the even columns, and thus, the resolution of the single eye cannot be reduced.

In prior art, when the grating state of the grating device is converted from a first moment to a second moment, the display panel is also in a process of image refreshing from the top down. At this point, a phenomenon that an image at the first moment and an image at the second moment are presented at the same time can occur, and hence an image crosstalk can be produced. As illustrated in FIG. 2, a fourth row pixel are just refreshed to display a second frame image, and at this time, pixels at the upper part of the display panel correspond to the grating state of the second moment and pixels at the lower part correspond to the grating state of the first moment, and hence the image crosstalk can be produced.

SUMMARY

An embodiment of the present invention provides a 3D display control method and a 3D display control device, which are configured to improve the 3D image crosstalk in the prior art.

The embodiment of the present invention provides a 3D display control method, comprising: sequentially acquiring left-eye image data or right-eye image data corresponding to each column of subpixels on a display panel for displaying a current frame image; and sequentially updating images displayed by each column of subpixels according to the left-eye image data or the right-eye image data for displaying the current frame image, and meanwhile updating light shielding regions and light transmitting regions of a grating device corresponding to a previous frame image, so as to achieve a naked-eye 3D image displaying.

The embodiment of the present invention provides a 3D display control device, comprising: an image acquiring unit, configured to sequentially acquire left-eye image data or right-eye image data of the current frame image corresponding to each column of subpixels on a display panel; and a 3D display control unit, configured to sequentially updating images displayed by each column of subpixels according to the left-eye image data or the right-eye image data for displaying the current frame image, and meanwhile update light shielding regions and light transmitting regions of a grating device corresponding to the previous frame image, so as to achieve the 3D naked-eye image displaying.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the present invention provides a 3D display control method and a 3D display control device, which can improve the image crosstalk in a current 3D displaying.

The 3D display control method and the 3D display control device provided by the embodiment of the present invention will be described below in conjunction with a 3D display system.

The 3D display system at least comprises: a display panel and a grating device disposed above the display panel. In the embodiment of the present invention, by combining the display panel for displaying an image by a column sequential scanning and the grating device, a 3D image displaying with low image crosstalk can be achieved.

The column sequential scanning type display panel and the 3D display system provided by the embodiment of the present invention will be described below at first.

Figure 1A:
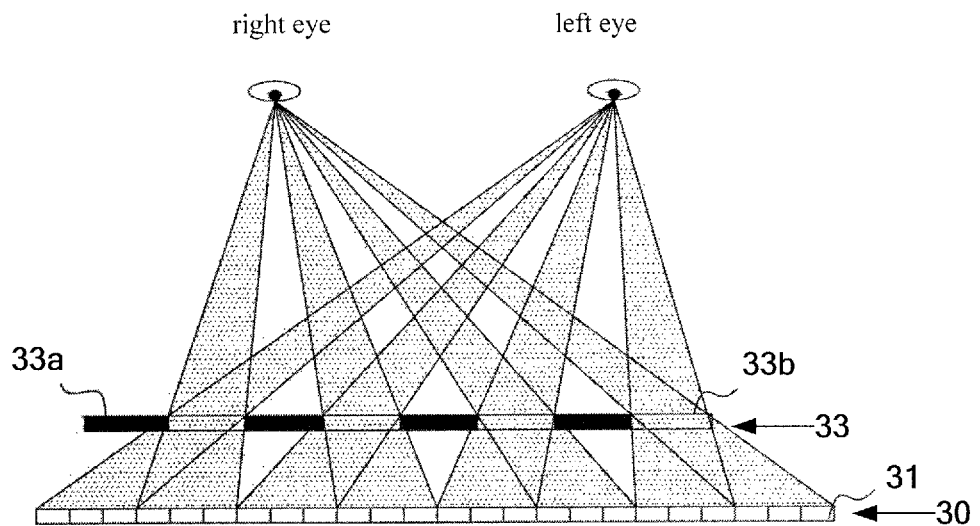
FIG. 1a is a schematic view illustrating a fundamental principle of a naked-eye 3D stereoscopic display (at the first moment)
Figure 1B:
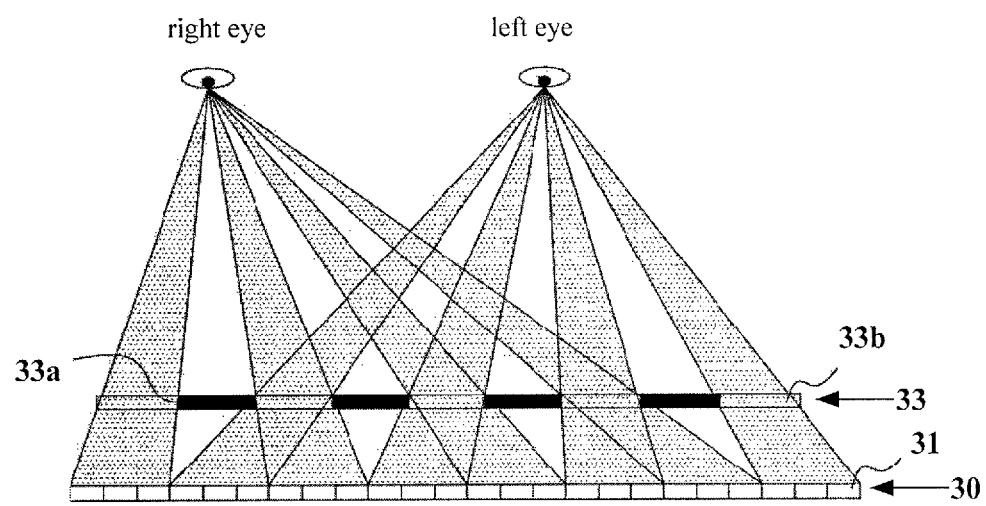
FIG. 1b is a schematic view illustrating the fundamental principle of the naked-eye 3D stereoscopic display (at the second moment)
Figure 2:
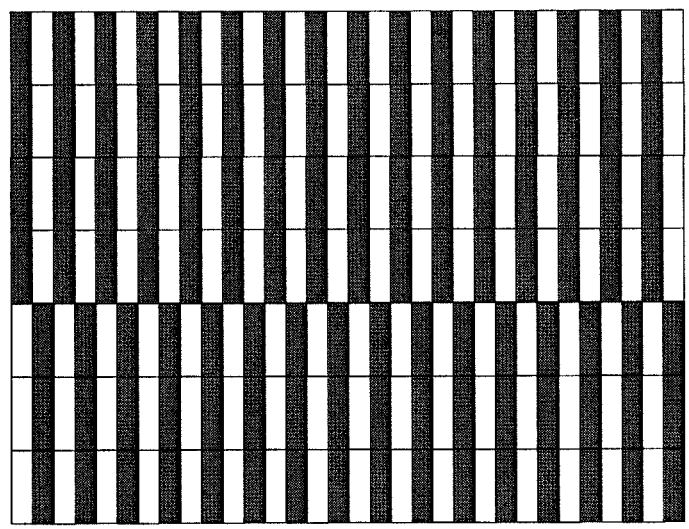
FIG. 2 is a schematic view illustrating the image crosstalk.
Figure 3:
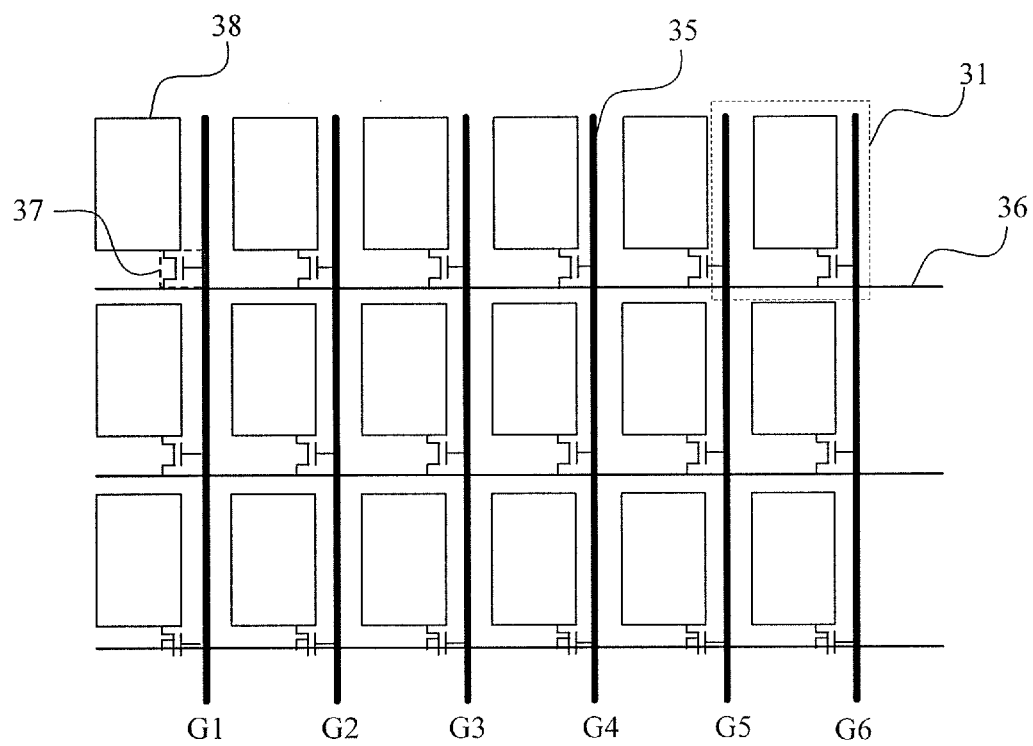
FIG. 3 is a schematic structural view of a display panel according to an embodiment of the present invention.

As illustrated in FIG. 3, the column sequential scanning type display panel provided by the embodiment of the present invention comprises: a group of gate lines 35 arranged along a column direction and a group of data lines 36 arranged along a row direction, in which a subpixel 31 is defined by two adjacent gate lines 35 and two adjacent data lines 36. Each subpixel 31 includes: a thin-film transistor (TFT) 37 and a pixel electrode 38, in which a gate of the TFT 37 is connected with the gate line 35; a source of the TFT 37 is connected with the data line 36; and a drain of the TFT 37 is connected with the pixel electrode 38.

A plurality of the gate lines 35 and the data lines 36 are connected to a drive control circuit which can only scan one column of subpixels at certain moment. For example, at a first moment, a gate line G1 is inputted a high voltage and the other gate lines are inputted a low voltage, TFTs 37 in the column of subpixels 31 corresponding to the gate line G1 are turned on and the data lines 36 input a signal voltage to the pixel electrodes 38 through the TFTs 37, so as to achieve the image displaying. At a second moment, a gate line G2 is inputted a high voltage and the other gate lines are inputted a low voltage; TFTs 37 in the column of subpixels 31 corresponding to the gate line G2 are turned on, and the data lines 36 input a signal voltage to the pixel electrodes 38 through the TFTs 37, so as to achieve the image displaying. In a similar fashion, each column of subpixels are refreshed in the display panel by the column sequential scanning.

Figure 4:
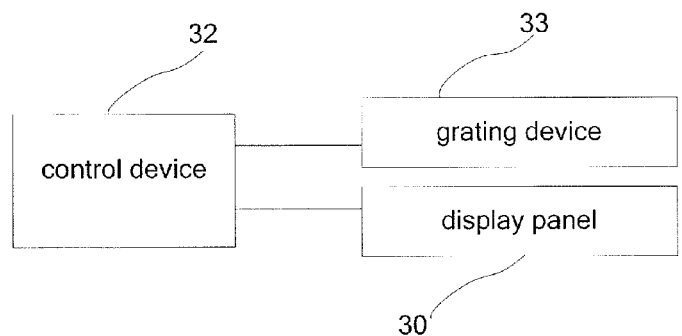
FIG. 4 is a schematic view of a 3D display system according to an embodiment of the present invention.

As illustrated in FIG. 4, the 3D display system provided by the embodiment of the present invention comprises: the column sequential scanning type display panel 30 as shown in FIG. 3, a grating device 33 disposed above the column sequential scanning type display panel 30, and a control device 32 connected with the column sequential scanning type display panel 30 and the grating device 33.

Figure 5:
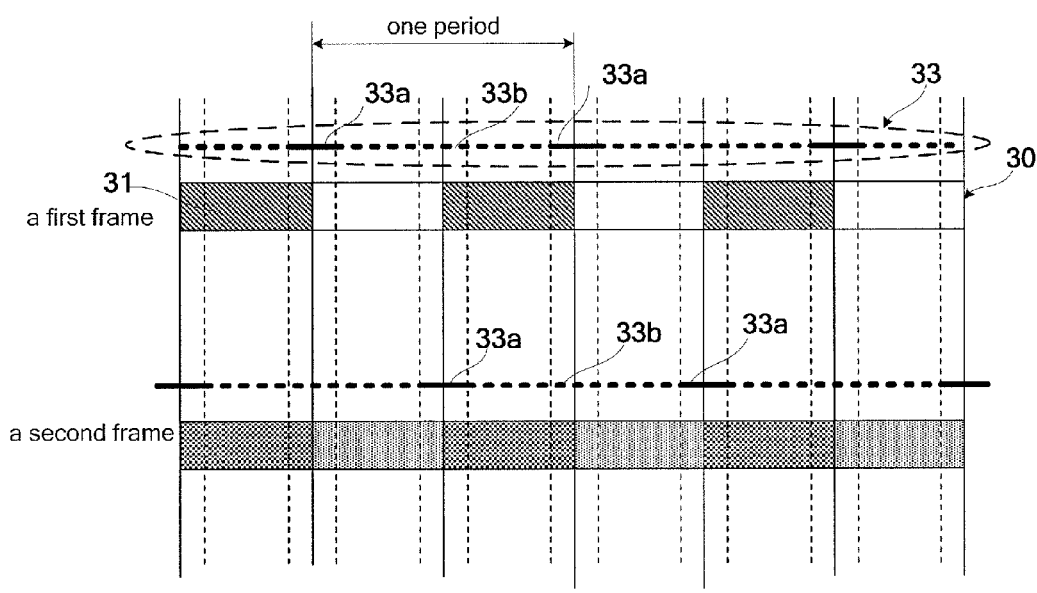
FIG. 5 is a schematic view illustrating a specific structure of a grating device according to an embodiment of the present invention.

As illustrated in FIG. 5 which is a schematic view illustrating a specific structure of the grating device 33 as shown in FIG. 4, the grating device 33 includes a plurality of grating units; each grating unit corresponds to two adjacent columns of subpixels and includes a first region 33b and second regions 33a with a equal size disposed on both sides of the first region 33b; and the first region 33b and the two second regions 33a are respectively in a light shielding state and a light transmitting state when the current frame image is not refreshed.

The control device 32 is configured to control the first region 33b to be in the light shielding state, in a case that the first region 33b corresponds to one column of subpixels which have been refreshed and an adjacent column of subpixels which are not refreshed, when the one column of subpixels and the adjacent column of subpixels are refreshed; and control a portion of the grating device 33 corresponding to a left region of the first column of subpixels to be in the light shielding state, when the first column of subpixels is refreshed, in the case that when the current frame image is not refreshed the left region of the first column of subpixels corresponds to the first region.

In one embodiment, the control device 32 is further configured to control a region of the grating device 33, corresponding to a column of subpixels which have been completely refreshed, to be in the grating state after a current frame image is completely refreshed.

In another embodiment, the control device 32 is further configured to control a region of the grating device 33, corresponding to the current column of subpixels and the adjacent column of subpixels which have been refreshed, to be in the grating state after the current frame image is completely refreshed, after the current column of subpixels are completely refreshed.

The 3D display control system provided by the embodiment of the present invention further comprises a backlight. The grating device is disposed on a light exiting side of the display panel or between the backlight and the display panel.

The grating device 33 is an active parallax barrier. The active parallax barrier may be formed by an LCD panel and may also be formed by a panel made of electrochromic material. Moreover, the active parallax barrier may also be an optical device in which light transmitting regions and light shielding regions are periodically and alternately arranged by actively controlling.

The column sequential scanning type display panel may be a thin film transistor liquid crystal display (TFT-LCD)

panel, a plasma display panel, an electroluminescent display panel or the like. In the embodiment of the present invention, the column sequential scanning type display panel is a TFT-LCD panel; one group of gate lines are arranged along the column direction and one group of data lines are arranged along the row direction.

The control method for achieving the 3D displaying and the 3D display control device provided by the embodiment of the present invention are illustrated on the basis of the system as shown in FIG. 4.

Figure 6:
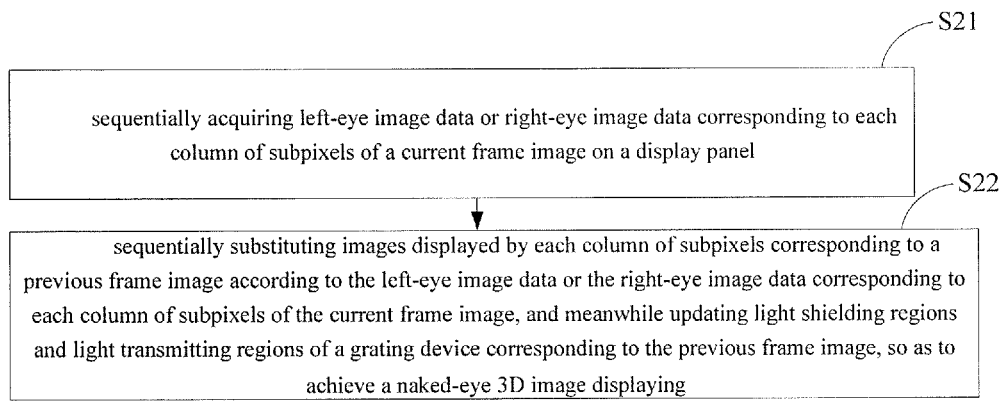
FIG. 6 is a flow view of a 3D display control method according to an embodiment of the present invention.

As illustrated in FIG. 6, the embodiment of the present invention provides a 3D display control method, which comprises the following steps:

S21: sequentially acquiring left-eye image data or right-eye image data corresponding to each column of subpixels of a current frame image on a display panel; and S22: sequentially substituting images displayed by each column of subpixels corresponding to a previous frame image according to the left-eye image data or the right-eye image data corresponding to each column of subpixels of the current frame image, and meanwhile updating light shielding regions and light transmitting regions of a grating device corresponding to the previous frame image, so as to achieve a naked-eye 3D image displaying.

Exemplarily, the step S22 includes: shading all the light transmitting regions of the grating device corresponding to any one column of subpixels, when the any one column of subpixels are being updated to display the current frame image; and after the any one column of subpixels are completely updated in the current frame, if a region of the grating device corresponding to the any one column of subpixels also corresponds to a next adjacent column of subpixels adjacent to the any one column of subpixels, when the next adjacent column of subpixels are not completely updated, still shading a light transmitting region of the grating device corresponding to both the any one column of subpixels and the next adjacent column of subpixels, and when the next adjacent column of subpixels are completely updated, immediately converting a state of the region of the grating device corresponding to both the any one column of subpixels and the next adjacent column of subpixels between a light shielding state and a light transmitting state; if the region of the grating device corresponding to the any one column of subpixels does not correspond to other column of subpixels, when the any one column of subpixels are completely updated, directly converting the state of the region of the grating device corresponding to the any one column of subpixels between the light shielding state and the light transmitting state.

Detailed description will be given below to the 3D display control method as shown in FIG. 6 with reference to the accompanying drawings.

The simple process for achieving the 3D displaying of the present invention is as follows:

Each frame image is displayed on the display panel by alternately displaying one column of left-eye image and one column of right-eye image, and one column of image corresponds to one column of subpixels. When displaying two adjacent frame images, as for each column of subpixels, in a previous frame image, the left-eye image is displayed and in the current frame image, the right-eye image is displayed in the column of subpixels. That is to say, image data acquired by the control device before displaying the previous frame image are 1L-2R-3L-4R-5L-6R- . . . in sequence; and image data acquired before displaying the current frame image are 1R-2L-3R-4L-5R-6L- . . . in sequence. 1, 2, 3, 4, 5 and 6 refer to the serial number of various columns of subpixels in the image; "R" refers to displaying the right-eye image; and "L" refers to displaying the left-eye image.

The grating device updates light shielding regions and light transmitting regions corresponding to subpixels at the same time when the images of the display panel are updated.

Figure 7:
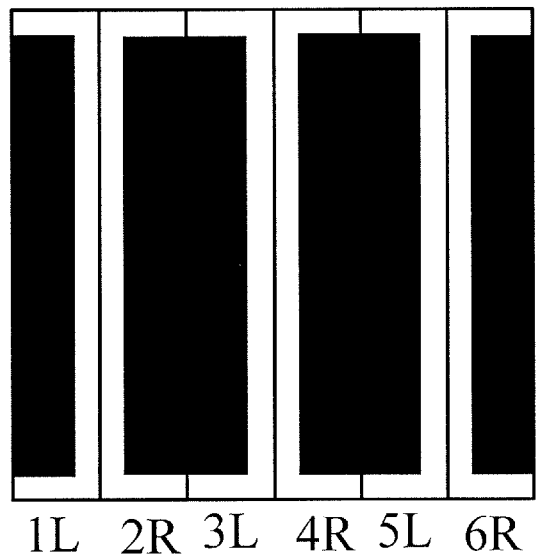
FIG. 7 is a schematic view of an image and a grating state after a previous frame image is updated in the method according to the embodiment of the present invention.

If the left-eye image (L) is displayed by subpixels in odd columns on the display panel in the previous frame image and the right-eye image (R) is displayed by subpixels in even columns, the image data acquired by the control device are 1L-2R-3L-4R-5L-6R- . . . in sequence. Moreover, when a region of the grating device corresponding to both the 2n−1th column of subpixels and the 2nth column of subpixels and having a predetermined width during displaying the previous frame image is a light transmitting region, the other regions are light shielding region, and n=1, 2, 3 . . . , as shown in FIG. 7 which is a schematic view illustrating the display principle of the display panel and a grating structure in the previous frame image.

Figure 8:
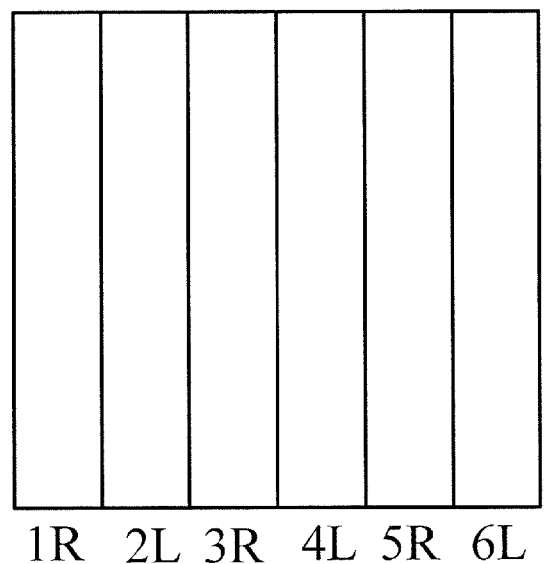
FIG. 8 is a schematic view of an image after a current frame image is updated in the method according to the embodiment of the present invention.

Step 1: sequentially acquiring left-eye image data or right-eye image data corresponding to each column of subpixels of a current frame image on a display panel. As illustrated in FIG. 8 which illustrates images corresponding to a plurality of columns of subpixels, image data acquired by the control device are 1R-2L-3R-4L-5R-6L- . . . in sequence.

Step 2: sequentially updating images displayed by various columns of subpixels in the current frame image according to the image data 1R-2L-3R-4L-5R-6L- . . . , and meanwhile updating light shielding regions and light transmitting regions of a grating device corresponding to the current frame image, so as to achieve the naked-eye 3D image display.

Figure 9:
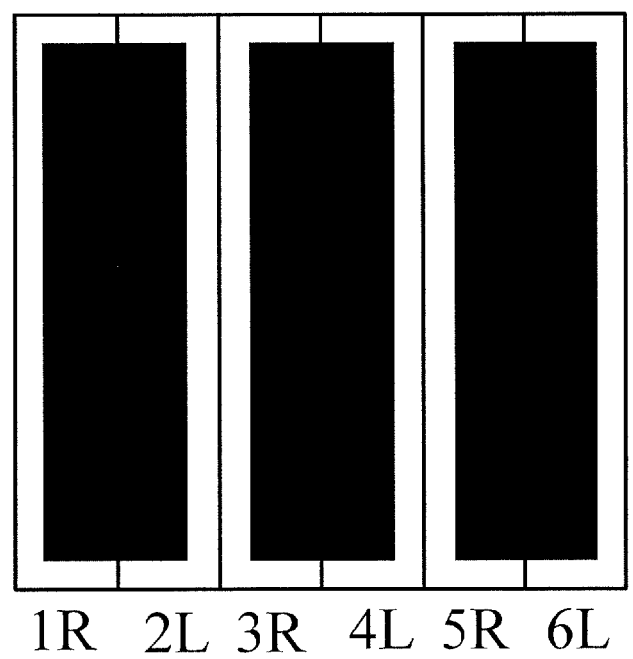
FIG. 9 is a schematic view of an image and a grating state after the current frame image is updated in the method according to the embodiment of the present invention.

The updated images displayed by various columns of subpixels in the current frame image are as shown in FIG. 8. As illustrated in FIG. 9, a region of the grating device of corresponding to both the 2nth column of subpixels and the 2n+1th column of subpixels and having a predetermined width during displaying the current frame image is updated to be a light transmitting region, and the other region is updated to be a light shielding region, wherein n= 1, 2, 3 . . . .

Detailed description will be given below to the specific procedure of updating the light shielding regions and the light transmitting regions of the grating device during updating the current frame image so as to achieve the naked-eye 3D image display without crosstalk. Two following exemplary procedures are given.

A first exemplary procedure: if a region of the grating device corresponding to both the 2n−1th column of subpixels and the 2nth column of subpixels and having a predetermined width during displaying the previous frame image is a light transmitting region and the other regions are light shielding regions, a region of the grating device of corresponding to both the 2nth column of subpixels and the 2n+1th column of subpixels and having a predetermined width during displaying the current frame image is updated to be a light transmitting region and the other regions are updated to be light shielding regions, wherein n= 1, 2, 3 . . . . That is to say, the image display and grating state as shown in FIG. 7 is updated to be the image display and the grating state as shown in FIG. 9.

A second exemplary procedure: if a region of the grating device corresponding to both the 2nth column of subpixels and the 2n+1 th column of subpixels and having a predetermined width during displaying the previous frame image is a light transmitting region and the other regions are light shielding regions, a region of the grating device of corresponding to both the 2n−1th column of subpixels and the 2nth column of subpixels and having a predetermined width during displaying the current frame image is updated to be a light transmitting region and the other regions are updated to be light shielding regions, wherein n=1, 2, 3 . . . . That is to say, the image display and grating state as shown in FIG. 9 is updated to be the image display and the grating state as shown in FIG. 7.

Exemplarily, the first exemplary procedure includes:

before a first column of subpixels is updated to display the current frame image, a light transmitting region of the grating device corresponding to both the first column of subpixels and a second column of subpixels and having a predetermined width is shaded in such a way that a region of the grating device corresponding to both the first column of subpixels and the second column of subpixels is a light shielding region; after the first column of subpixels is updated to display the current frame image, a region of the grating device corresponding to a region having a predetermined width of the first column of subpixels close to a frame of the display panel (that is, a region of the grating device only corresponding to the first column of subpixels) is updated to be a light transmitting region, and meanwhile an image displayed by the second column of subpixels is updated, and a light transmitting region of the grating device corresponding to both a third column of subpixels and a fourth column of subpixels and having a predetermined width is shaded in such a way that a region of the grating device corresponding to the third column of subpixels and the fourth column of subpixels is a light shielding region;

after the second column of subpixels is completely updated, an image displayed by the third column of subpixels is updated; after the third column of subpixels is updated, a region of the grating device corresponding to both the second column of subpixels and the third column of subpixels and having a predetermined width is updated to be a light transmitting region, and meanwhile an image displayed in the fourth column of subpixels is updated, and a light transmitting region of the grating device corresponding to both a fifth column of subpixels and a sixth column of subpixels and having a predetermined width is shaded in such a way that a region of the grating device corresponding to the fifth column of subpixels and the sixth column of subpixels is a light shielding region, and so on, until a final column of subpixels are completely updated.

Exemplarily, the second exemplary procedure includes:

before the first column of subpixels is updated to display the current frame image, a light transmitting region of the grating device corresponding to a region of the first column of subpixels close to the frame of the display panel (that is, a region of the grating device only corresponding to the first column of subpixels) is shaded in such a way that a region of the grating device corresponding to the first column of subpixels is a light shielding region; and an image displayed by the first column of subpixels is updated; after the image displayed by the first column of subpixels is completely updated, a light transmitting region of the grating device corresponding to both the second column of subpixels and the third column of subpixels and having a predetermined width is shaded, and meanwhile an image displayed by the second column of subpixels is updated; after the image displayed by the second column of subpixels is completely updated, a region of the grating device, corresponding to both the first column of subpixels and the second column of subpixels and having a predetermined width is updated to be a light transmitting region, and meanwhile an image displayed by the third column of subpixels is updated;

after the image displayed by the third column of subpixels is completely updated, a light transmitting region of the grating device corresponding to both the fourth column of subpixels and the fifth column of subpixels and having a predetermined width is shaded, and meanwhile an image displayed by the fourth column of subpixels is updated; after the image displayed by the fourth column of subpixels is completely updated, a region of the grating device corresponding to both the third column of subpixels and the fourth column of subpixels and having a predetermined width, is updated to be a light transmitting region, and meanwhile an image displayed by the fifth column of subpixels is updated. In a similar fashion, the light transmitting state or the light shielding state of regions of the grating device corresponding to all columns of subpixels are updated in sequence.

Detailed description will be given below to an image updating procedure of the first exemplary procedure with reference to the accompanying drawings.

1. Updating the image displayed by the first column of subpixels: before the first column of subpixels is updated to display the current frame image, a light transmitting region of the grating device as shown in FIG. 7 corresponding to both the first column of subpixels and a second column of subpixels and having a predetermined width is shaded in such a way that a region of the grating device corresponding to both the first column of subpixels and the second column of subpixels is a light shielding region; and when the image displayed by the first column of subpixels is updated from a left-eye image into a right-eye image, the region of the grating device only corresponding to the first column of subpixels (the left side, namely a side of close to the frame of the display panel) is updated to be a light transmitting region, as illustrated in FIG. 10.

When the region of the grating device corresponding to the first column of subpixels is updated to being in the light shielding state or the light transmitting state, as the right-eye image is displayed in both the first column of subpixels and the second column of subpixels, the crosstalk may be occur. In the embodiment of the present invention, when the first column of subpixels are updated, the light transmitting region of the grating device corresponding to both the first column of subpixels and the second column of subpixels and having a predetermined width is shaded, so that the displaying crosstalk between the first column of subpixels and the second column of subpixels can be avoided. The following image updating procedures are similar.

2. Updating the image displayed by the second column of subpixels: in a procedure of updating the second column of subpixels, the states of the light shielding regions and the light transmitting regions of the grating device are not unchanged.

Figure 10:
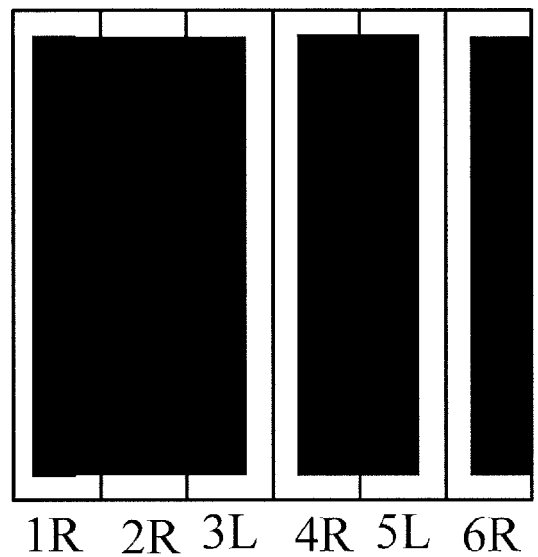
FIG. 10 is a schematic view of an image and a grating state after a first column of subpixels of the current frame are updated in the method according to the embodiment of the present invention.
Figure 11:
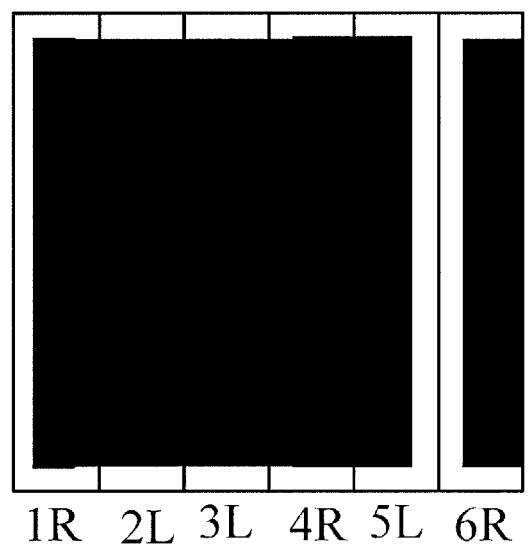
FIG. 11 is a schematic view of an image and a grating state after a second column of subpixels of the current frame are updated in the method according to the embodiment of the present invention.

When the image displayed by the second column of subpixels is completely updated from the right-eye image to the left-eye image, the light transmitting region of the grating device as shown in FIG. 10 corresponding to both the third column of subpixels and the fourth column of subpixels and having a predetermined width is shaded in such a way that the region of the grating device corresponding to the third column of subpixels and the fourth column of subpixels is a completely light shielding region, as illustrated in FIG. 11.

Figure 12:
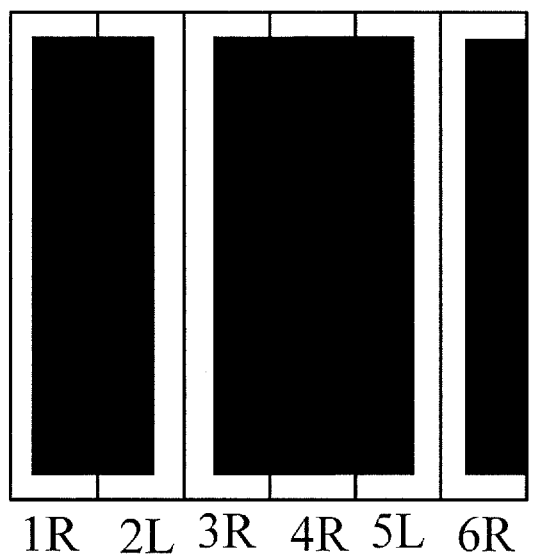
FIG. 12 is a schematic view of an image and a grating state after a third column of subpixels of the current frame are updated in the method according to the embodiment of the present invention.

3. Updating the image displayed by the third column of subpixels: when the image displayed by the third column of subpixels is completely updated from the left-eye image to the right-eye image, the region of the grating device as shown in FIG. 11 corresponding to both the second column of columns and the third column of subpixels and having a predetermined width is updated to be a light transmitting region, as illustrated in FIG. 12.

Figure 13:
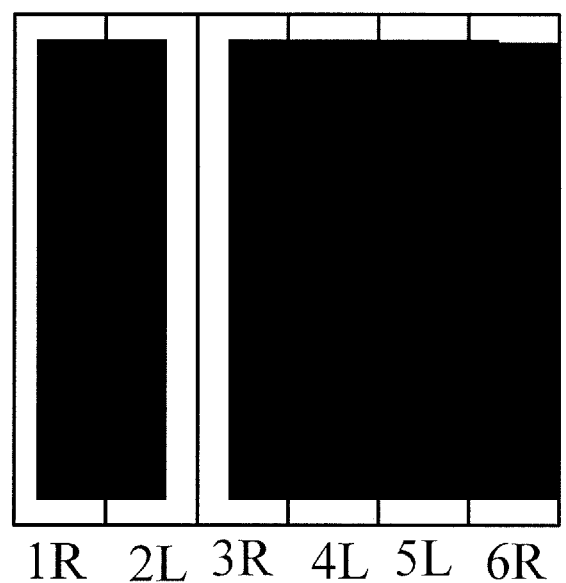
FIG. 13 is a schematic view of an image and a grating state after a fourth column of subpixels of the current frame are updated in the method according to the embodiment of the present invention.

4. Updating the image displayed by the fourth column of subpixels: when the image displayed by the fourth column of subpixels is completely updated from the right-eye image to the left-eye image, the light transmitting region of the grating device corresponding to both the fifth column of subpixels and the sixth column of subpixels and having a predetermined width is shaded in such a way that the region of the grating device as shown in FIG. 12 corresponding to the fifth column of subpixels and the sixth column of subpixels is a completely light shielding region, as illustrated in FIG. 13.

Figure 14:
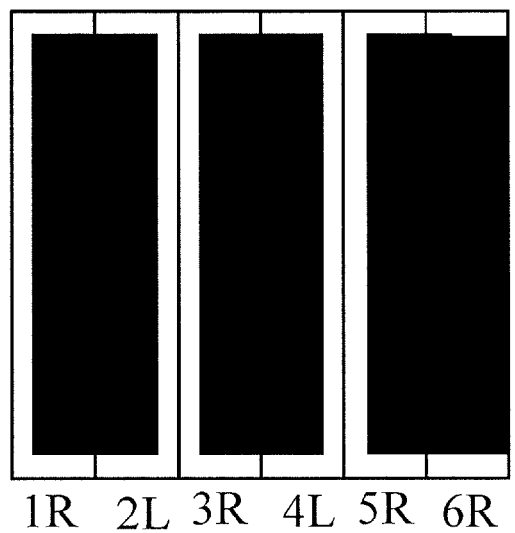
FIG. 14 is a schematic view of an image and a grating state after a fifth column of subpixels of the current frame are updated in the method according to the embodiment of the present invention.

5. Updating the image displayed by the fifth column of subpixels: when the image displayed by the fifth column of subpixels is completely updated from the left-eye image to the right-eye image, the region of the grating device corresponding to both the fourth column of subpixels and the fifth column of subpixels and having a predetermined width is updated to be a light transmitting region, as illustrated in FIG. 14.

An image displayed by each next column of subpixels is updated in a similar fashion.

Supposing that a sixth column of subpixels are a final column of subpixels, the procedure of updating an image displayed by the sixth column of subpixels is as follows.

6. Updating the image displayed by the sixth column of subpixels: when the image displayed by the sixth column of subpixels is completely updated from the right-eye image to the left-eye image, a region of the grating device as shown in FIG. 14 only corresponding to the sixth column of subpixels (the rightmost side, namely, a side close to the frame of the display panel) is updated to be a light transmitting region. The updated image and the grating state are illustrated in FIG. 9.

The foregoing is a procedure of updating the current frame image. A procedure of updating a next frame image, namely the procedure of updating the image display and the grating state as shown in FIG. 9 into the image display and the grating state as shown in FIG. 7 (namely the updating procedure of the second exemplary procedure), will be described below.

Figure 15:
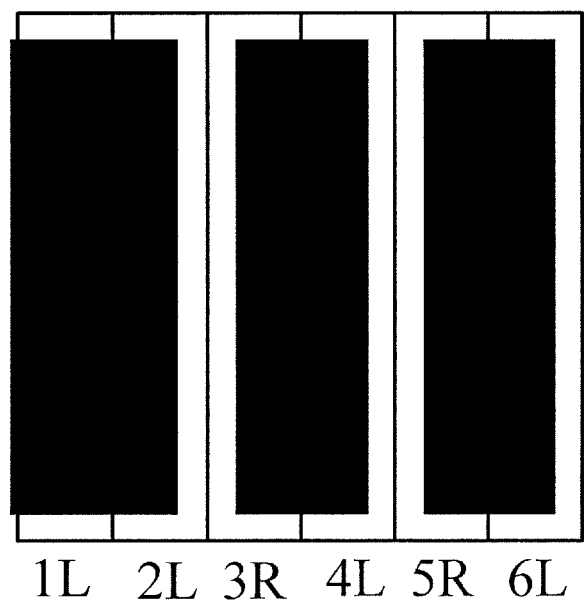
FIG. 15 is a schematic view of an image and a grating state after a first column of subpixels of the next frame are updated in the method according to the embodiment of the present invention.

1. Updating the image displayed by the first column of subpixels: before the image 1R displayed by the first column of subpixels is updated to display the current frame image, the light transmitting region of the grating device corresponding to the region with a predetermined width and close to the frame of the display panel of the first column of subpixels is shaded in such a way that the region of the grating device corresponding to the first column of subpixels is a completely light shielding region; and the image displayed by the first column of subpixels is updated, and as illustrated in FIG. 15, the image displayed by the first column of subpixels is updated from the left-eye image to the right-eye image. As the first column of subpixels are completely shaded in the updating procedure and a region adjacent to the first column of subpixels in the region of the grating device corresponding to the second column of subpixels, is also in the light shielding state, the image crosstalk between the first column of subpixels and the second column of subpixels in the updating procedure can be avoided.

Figure 16:
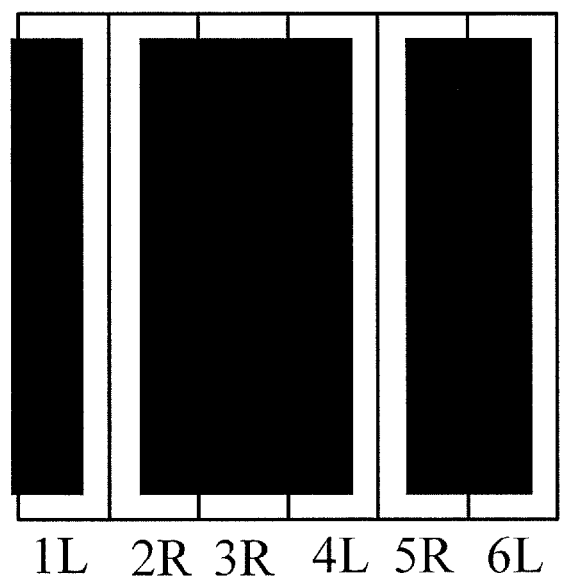
FIG. 16 is a schematic view of an image and a grating state after a second column of subpixels of the next frame are updated in the method according to the embodiment of the present invention.

2. Updating the image displayed by the second column of subpixels: after the image displayed by the first column of subpixels is completely updated, the light transmitting region of the grating device as shown in FIG. 15 corresponding to both the second column of subpixels and the third column of subpixels and having a predetermined width is shaded, and meanwhile the image displayed by the second column of subpixels is updated; and when the image displayed by the second column of subpixels is completely updated from the left-eye image to the right-eye image, the region of the grating device corresponding to both the first column of subpixels and the second column of subpixels and having a predetermined width is updated to be a light transmitting region, as illustrated in FIG. 16.

Figure 17:
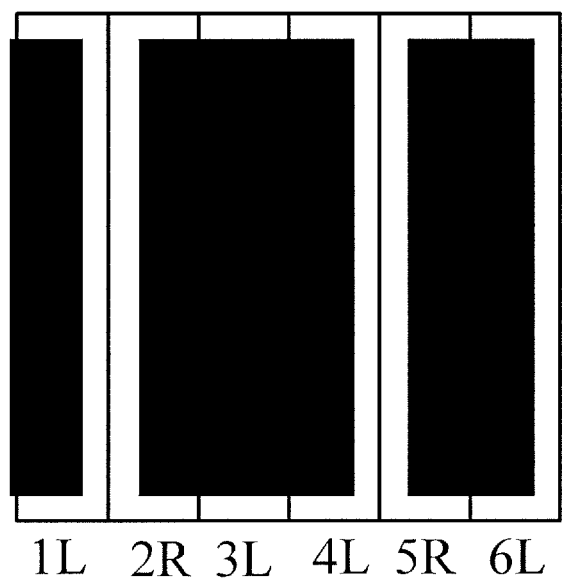
FIG. 17 is a schematic view of an image and a grating state after a third column of subpixels of the next frame are updated in the method according to the embodiment of the present invention.

3. Updating the image displayed by the third column of subpixels: after the region of the grating device corresponding to both the first column of subpixels and the second column of subpixels and having a predetermined width is updated to be a light transmitting region, the image displayed by the third column of subpixels is updated from the right-eye image to the left-eye image, as illustrated in FIG. 17.

Figure 18:
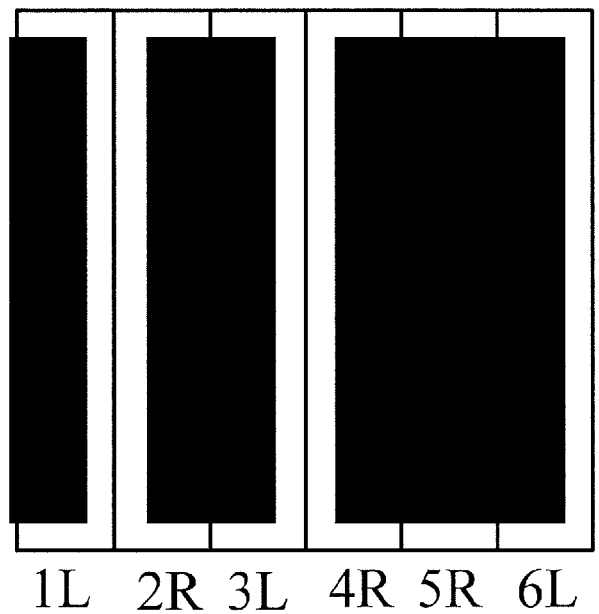
FIG. 18 is a schematic view of an image and a grating state after a fourth column of subpixels of the next frame are updated in the method according to the embodiment of the present invention.

4. Updating the image displayed by the fourth column of subpixels: after the image displayed by the third column of subpixels is completely updated, the light transmitting region of the grating device as shown in FIG. 17 corresponding to both the fourth column of subpixels and the fifth column of subpixels and having a predetermined width is shaded, and meanwhile the image displayed by the fourth column of subpixels is updated; and when the image displayed by the fourth column of subpixels is completely updated from the left-eye image to the right-eye image, the region of the grating device corresponding to both the third column of subpixels and the fourth column of subpixels and having a predetermined width is updated to be a light transmitting region, as illustrated in FIG. 18.

Figure 19:
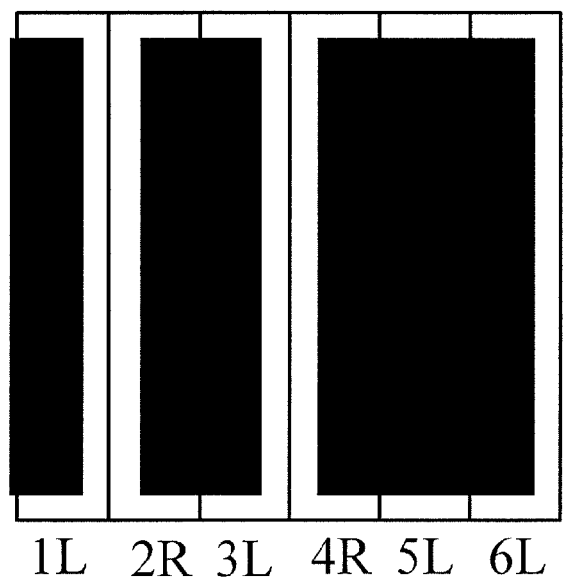
FIG. 19 is a schematic view of an image and a grating state after a fifth column of subpixels of the next frame are updated in the method according to the embodiment of the present invention.

5. Updating the image displayed by the fifth column of subpixels: after the region of the grating device corresponding to both the third column of subpixels and the fourth column of subpixels and having a predetermined width is updated to be a light transmitting region, the image displayed by the fifth column of subpixels is updated from the right-eye image to the left-eye image, as illustrated in FIG. 19.

An image displayed by each next column of subpixels is updated in a similar fashion.

Supposing that an image displayed by the sixth column is an image of a final column, a procedure of updating the image of the final column is as follows.

6. Updating the image displayed by the sixth column of subpixels: after the image displayed by the fifth column of subpixels is completely updated, the light transmitting region of the grating device corresponding to the sixth column of subpixels as shown in FIG. 19 is shaded, and meanwhile the image displayed by the sixth column of subpixels is updated; and when the image displayed by the sixth column of subpixels is completely updated from the left-eye image to the right-eye image, the region of the grating device corresponding to both the fifth column of subpixels and the sixth column of subpixels and having a predetermined width is updated to be a light transmitting region, as shown in FIG. 7.

The updating procedure is performed from left to right based on the above procedure until one frame image is completely refreshed. Subsequently, the displaying and the updating procedure of the state of the grating device for a next frame image are performed. As for different frame images, if the current frame image adopts the image display and the grating state as shown in FIG. 7, the next frame image is updated to be in the image display and the grating state as shown in FIG. 9; next, the next frame is updated to be in the image display and the grating state as shown in FIG. 7; and next, the next frame is updated to be in the image display and the grating state as shown in FIG. 9.

Figure 20:
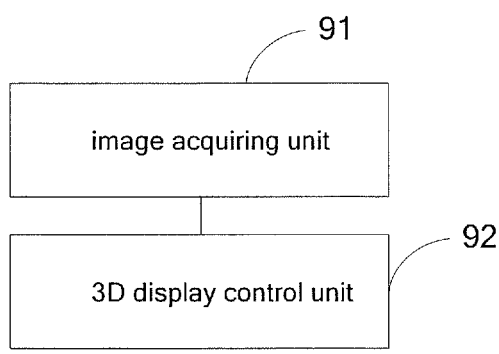
FIG. 20 is a schematic structural view of a device corresponding to the 3D display control method according to an embodiment of the present invention.

The embodiment of the present invention further provides a 3D display control device corresponding to the 3D display control method. As illustrated in FIG. 20, the device comprises: an image acquiring unit 91, configured to sequentially acquire left-eye image data or right-eye image data of the current frame image corresponding to various columns of subpixels on a display panel; and a 3D display control unit 92, configured to sequentially update images displayed by various columns of subpixels in the previous frame image according to the left-eye image data or the right-eye image data corresponding to various columns of subpixels, and meanwhile update light shielding regions and light transmitting regions of a grating device corresponding to the previous frame image, so as to achieve the 3D naked-eye image displaying.

Specifically, the 3D display control unit 92 is configured to: shade all the light transmitting regions of the grating device corresponding to any one column of subpixels, when the any one column of subpixels is being updated to display the current frame image; after the any one column of subpixels are completely updated, if a region of the grating device corresponding to the any one column of subpixels also corresponds to a next adjacent column of subpixels adjacent to the any one column of subpixels, when the next adjacent column of subpixels are not completely updated, still shading a light transmitting region of the grating device corresponding to both the any one column of subpixels and the next adjacent column of subpixels, and when the next adjacent column of subpixels are completely updated, immediately converting a state of the region of the grating device corresponding to both the any one column of subpixels and the next adjacent column of subpixels between a light shielding state and a light transmitting state; if the region of the grating device corresponding to the any one column of subpixels does not correspond to other column of subpixels, when the any one column of subpixels are completely updated, directly converting the state of the region of the grating device corresponding to the any one column of subpixels between the light shielding state and the light transmitting state.

Optionally, the 3D display control unit 92 is specifically configured to: update a region of the grating device of corresponding to both the 2nth column of subpixels and the 2n+1th column of subpixels and having a predetermined width into a light transmitting region and update other regions into light shielding regions during displaying the current frame image, when a region of the grating device corresponding to both the 2n−1th column of subpixels and the 2nth column of subpixels and having a predetermined width is a light transmitting region, the other regions are light shielding region during displaying the previous frame image, wherein n=1, 2, 3 . . . , and update a region of the grating device corresponding to both the 2n−1th column of subpixels and the 2nth column of subpixels and having a predetermined width into a light transmitting region and update other regions into light shielding regions during displaying the current frame image, when a region of the grating device corresponding to both the 2nth column of subpixels and the 2n+1th column of subpixels and having a predetermined width is a light transmitting region and the other regions are light shielding regions during displaying the previous frame image, in which n=1, 2, 3 . . . .

Optionally, when the region of the grating device corresponding to both the 2n−1th column of subpixels and the 2nth column of subpixels and having a predetermined width is a light transmitting region and the other regions are light shielding regions during displaying the previous frame image, the 3D display control unit 92 is configured to: before a first column of subpixels is updated to display the current frame image, a light transmitting region of the grating device corresponding to both the first column of subpixels and a second column of subpixels and having a predetermined width is shaded in such a way that a region of the grating device corresponding to both the first column of subpixels and the second column of subpixels is a light shielding region; after the first column of subpixels is updated to display the current frame image, a region of the grating device corresponding to a region having a predetermined width of the first column of subpixels close to a frame of the display panel (that is, a region of the grating device only corresponding to the first column of subpixels) is updated to be a light transmitting region, and meanwhile an image displayed by the second column of subpixels is updated;

after the image displayed by the second column of subpixels is completely updated, a light transmitting region of the grating device corresponding to both a third column of subpixels and a fourth column of subpixels and having a predetermined width is shaded in such a way that a region of the grating device corresponding to both the third column of subpixels and the fourth column of subpixels is a light shielding region and an image display by the third column of subpixels is updated; after the image displayed by the third column of subpixels is completely updated, a region of the grating device corresponding to both the second column of subpixels and the third column of subpixels and having a predetermined width is updated to be in a light transmitting state, and meanwhile the image displayed by the fourth column of subpixels is updated;

after the image displayed by the fourth column of subpixels is completely updated, shade a light transmitting region of the grating device corresponding to both the fifth column of subpixels and the sixth column of subpixels and having a predetermined width so that a region of the grating device corresponding to the fifth column of subpixels and the sixth column of subpixels is a completely light shielding region, and meanwhile update an image displayed by the fifth column of subpixels; after the image displayed by the fifth column of subpixels is completely updated, update a region of the grating device corresponding to both the fourth column of subpixels and the fifth column of subpixels and having a predetermined width into a light transmitting region, and meanwhile update an image displayed by the sixth column of subpixels; and so on, until a final column of subpixels are completely updated.

Optionally, when a region of the grating device corresponding to both the 2nth column of subpixels and the 2n+1th column of subpixels and having a predetermined width during displaying the previous frame image is a light transmitting region and the other regions are light shielding regions, the 3D display control unit 92 is configured to: before the first column of subpixels is updated to display the current frame image, shade a light transmitting region of the grating device corresponding to a region of the first column of subpixels close to the frame of the display panel (that is, a region of the grating device only corresponding to the first column of subpixels) in such a way that a region of the grating device corresponding to the first column of subpixels is a light shielding region; and update an image displayed by the first column of subpixels; after the image displayed by the first column of subpixels is completely updated, shade a light transmitting region of the grating device corresponding to both the second column of subpixels and the third column of subpixels and having a predetermined width, and meanwhile update an image displayed by the second column of subpixels; after the image displayed by the second column of subpixels is completely updated, update a region of the grating device corresponding to both the first column of subpixels and the second column of subpixels and having a predetermined width into a light transmitting region, and meanwhile update an image displayed by the third column of subpixels;

after the image displayed by the third column of subpixels is completely updated, shade a light transmitting region of the grating device corresponding to both the fourth column of subpixels and the fifth column of subpixels and having a predetermined width, and meanwhile update an image displayed by the fourth column of subpixels; after the image displayed by the fourth column of subpixels is completely updated, update a region of the grating device corresponding to both the third column of subpixels and the fourth column of subpixels and having a predetermined width into a light transmitting region, and meanwhile update an image displayed by the fifth column of subpixels; in a similar fashion, until the final column of subpixels are completely updated.

Herein, it should be noted that default width of the light transmitting region in the grating device, corresponding to both the 2nth column of subpixels and the 2n+1 th column of subpixels, may be equal to or not equal to the default width of the light transmitting region in the grating device, corresponding to both the 2n−1th column of subpixels and the 2nth column of subpixels.

Optionally, the grating device is a parallax barrier.

Herein, it should be noted that: when the light transmitting state and the light shielding state of the light transmitting regions and the light shielding regions of the grating device are converted, the size of the light shielding regions and the light transmitting regions may also be changed or unchanged, as long as the converted grating device can separate the left-eye image and the right-eye image. For example, when the size of a light transmitting region during displaying the previous one frame is a, the light transmitting region will be converted into a light shielding region in the next frame, and the size of the light shielding region is b; and b may be equal to or not equal to a.

In the embodiment of the present invention, when an image displayed by any one column of subpixels is updated, a region of the grating device corresponding to the any one column of subpixels and the adjacent column of subpixels adjacent to the any one column of subpixels is controlled to be a light shielding region, and hence the crosstalk between the adjacent column of subpixels when the image displayed by the any one column of subpixels is refreshed can be avoided.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A 3D display control method, comprising:
sequentially acquiring left-eye image data or right-eye image data corresponding to each column of subpixels on a display panel for displaying a current frame image; and
sequentially updating images displayed by each column of subpixels according to the left-eye image data or the right-eye image data for displaying the current frame image, and meanwhile updating light shielding regions and light transmitting regions of a grating device corresponding to a previous frame image, so as to achieve a naked-eye 3D image displaying;
wherein the sequentially updating images displayed by each column of subpixels according to the left-eye image data or the right-eye image data for displaying the current frame image, and meanwhile updating light shielding regions and light transmitting regions of a grating device corresponding to a previous frame image comprises:
shading all the light transmitting regions of the grating device corresponding to any one column of subpixels, when the any one column of subpixels are being updated to display the current frame image; and
after the any one column of subpixels are completely updated, if a region of the grating device corresponding to the any one column of subpixels also corresponds to a next adjacent column of subpixels adjacent to the any one column of subpixels, when the next adjacent column of subpixels are not completely updated, still shading a light transmitting region of the grating device corresponding to both the any one column of subpixels and the next adjacent column of subpixels, and when the next adjacent column of subpixels are completely updated, immediately converting a state of the region of the grating device corresponding to both the any one column of subpixels and the next adjacent column of subpixels between a light shielding state and a light transmitting state; if the region of the grating device corresponding to the any one column of subpixels does not correspond to other columns of subpixels, when the any one column of subpixels are completely updated, immediately converting the state of the region of the grating device corresponding to the any one column of subpixels between the light shielding state and the light transmitting state.

2. The 3D display control method according to claim 1, wherein the updating the light shielding regions and the light transmitting regions of the grating device comprises:
when a region of the grating device corresponding to both the $2n-1^{th}$ column of the subpixels and the $2n^{th}$ column of subpixels and having a first predetermined width during displaying the previous frame image is a light transmitting region and the other regions are light shielding regions, updating a region of the grating device corresponding to both the $2n^{th}$ column of subpixels and the $2n+1^{th}$ column of subpixels and having a second predetermined width during displaying the current frame image into a light transmitting region and updating the other regions into light shielding regions, wherein n=1, 2, 3 . . . ; and
when a region of the grating device corresponding to both the $2n^{th}$ column of subpixels and the $2n+1^{th}$ column of subpixels and having the second predetermined width during displaying the previous frame is a light transmitting region and the other regions are light shielding regions, updating a region of the grating device corresponding to both the $2n-1^{th}$ column of subpixels and the $2n^{th}$ column of subpixels and having the first predetermined with during displaying the current frame into a light transmitting region and updating the other regions into light shielding regions, wherein n=1, 2, 3 . . . .

3. The 3D display control method according to claim 2, wherein the updating the region of the grating device corresponding to both the $2n^{th}$ column of subpixels and the $2n+1^{th}$ column of subpixels and having the second predetermined width during displaying the current frame image into the light transmitting region and updating the other regions into light shielding regions includes:

before a first column of subpixels is updated to display the current frame image, shading a light transmitting region of the grating device corresponding to both the first column of subpixels and a second column of subpixels and having the first predetermined width in such a way that a region of the grating device corresponding to both the first column of subpixels and the second column of subpixels is a light shielding region; after the first column of subpixels is updated to display the current frame image, updating a region of the grating device only corresponding to the first column of subpixels into a light transmitting region, and meanwhile an image displayed by the second column of subpixels is updated;

after the image displayed by the second column of subpixels is completely updated, shading a light transmitting region of the grating device corresponding to both a third column of subpixels and a fourth column of subpixels and having a first predetermined width in such a way that a region of the grating device corresponding to the third column of subpixels and the fourth column of subpixels is a light shielding region, and meanwhile updating an image displaying by the third column of subpixels;

after the image displayed by the third column of subpixels is completely updated, updating the region of the grating device corresponding to the second column of subpixels and the third column of subpixels having the second predetermined width into a light transmitting region, and meanwhile updating an image displayed by the fourth column of subpixels;

after the image displayed by the fourth column of subpixels is completely updated, shading a light transmitting region of the grating device corresponding to both a fifth column of subpixels and a sixth column of subpixels and having a first predetermined with so that a region of the grating device corresponding to the fifth column of subpixels and the sixth column of subpixels is a light shielding region, and meanwhile updating an image displayed by the fifth column of subpixels; after the image displayed by the fifth column of subpixels is completely updated, updating a region of the grating device corresponding to both the fourth column of subpixels and the fifth column of subpixels and having a second predetermined width into a light transmitting region, and meanwhile updating an image displayed by the sixth column of subpixels; and so on, until a final column of subpixels are completely updated.

4. The 3D display control method according to claim 2, wherein the updating the region of the grating device of corresponding to both the $2n-1^{th}$ column of subpixels and the $2n^{th}$ column of subpixels and having the first predetermined width during displaying the current frame image into a light transmitting region and updating the other regions into light shielding regions includes:

before a first column of subpixels is updated to display the current frame image, shading a light transmitting region of the grating device corresponding to the first column of subpixels and having the second predetermined width in such a way that a region of the grating device corresponding to the first column of subpixels is a light shielding region; and updating an image displayed by the first column of subpixels; after the image displayed by the first column of subpixels is completely updated, shading a light transmitting region of the grating device corresponding to both a second column of subpixels and a third column of subpixels and having the second predetermined width, and meanwhile updating an image displayed by the second column of subpixels; after the image displayed by the second column of subpixels is completely updated, updating a region of the grating device corresponding to both the first column of subpixels and the second column of subpixels and having the first predetermined width into a light transmitting region, and meanwhile updating an image displayed by the third column of subpixels;

after the image displayed by the third column of subpixels is completely updated, shading a light transmitting region of the grating device corresponding to both a fourth column of subpixels and a fifth column of subpixels and having the second predetermined width, and meanwhile updating an image displayed by the fourth column of subpixels; after the image displayed by the fourth column of subpixels is completely updated, updating a region of the grating device corresponding to both the third column of subpixels and the fourth column of subpixels and having the first predetermined width into a light transmitting region, and meanwhile updating an image displayed by the fifth column of subpixels; in a similar fashion, until a final column of subpixels are completely updated.

5. The 3D display control method according to claim 1, wherein the updating the light shielding regions and the light transmitting regions of the grating device during displaying the current frame image includes:

updating light shielding regions and light transmitting regions of a parallax barrier corresponding to the previous frame image.

6. The 3D display control method according to claim 2, wherein the first predetermined width is equal to the second predetermined width.

7. The 3D display control method according to claim 2, wherein the first predetermined width is not equal to the second predetermined width.

8. A 3D display control device, comprising:

an image acquiring unit, configured to sequentially acquire left-eye image data or right-eye image data of the current frame image corresponding to each column of subpixels on a display panel; and a 3D display control unit, configured to sequentially update images displayed by each column of subpixels according to the left-eye image data or the right-eye image data for displaying the current frame image, and meanwhile update light shielding regions and light transmitting regions of a grating device corresponding to the previous frame image, so as to achieve the 3D naked-eye image displaying;

wherein the 3D display control unit is configured to:

shade all the light transmitting regions of the grating device corresponding to any one column of subpixels, when the any one column of subpixels is being updated to display the current frame image; and after any one column of subpixels are completely updated, if a region of the grating device corresponding to the any one column of subpixels and also corresponds to the a next adjacent column of subpixels adjacent to the any one column of subpixels, when the next adjacent column of subpixels are not completely updated, still shade a light transmitting region of the grating device corresponding to both the any one column of subpixels and the next adjacent column of subpixels, and when the next adjacent column of subpixels are completely updated, immediately convert a state of the region of the grating device corresponding to both the any one column of subpixels and the next adjacent column of subpixels between a light shading state and a light transmitting state; if the region of the grating device corresponding to the any one column of subpixels does not correspond to other column of subpixels, when the any one column of subpixels are completely updated, immediately convert the state of the grating device corresponding to the any one column of subpixels between the light shielding state and the light transmitting state.

9. The 3D display control device according to claim 8, wherein the 3D display control unit is configured to: update a region of the grating device corresponding to both the $2n^{th}$ column of subpixels and the $2n+1^{th}$ column of subpixels and having a second predetermined width into a light transmitting region and update the other regions into light shielding regions during displaying the current frame image, when a region of the grating device corresponding to both the $2n-1^{th}$ column of subpixels and the $2n^{th}$ column of subpixels and having a first predetermined width is a light transmitting region and other regions are light shielding region during displaying the previous frame image, wherein n=1, 2, 3 . . . , and update a region of the grating device corresponding to both the $2n-1^{th}$ column of subpixels and the $2n^{th}$ column of subpixels and having the first predetermined width into a light transmitting region and update other regions into light shielding regions during displaying the current frame image, when a region of the grating device corresponding to both the $2n^{th}$ column of subpixels and the $2n+1^{th}$ column of subpixels and having the second predetermined width is a light transmitting region and the other regions are light shielding regions during displaying the previous frame image, in which n=1, 2, 3 . . . .

10. The 3D display control device according to claim 9, wherein the 3D display control unit is configured to: before a first column of subpixels is updated to display the current frame image, shade a light transmitting region of the grating device corresponding to both the first column of subpixels and a second column of subpixels and having the first predetermined width in such a way that a region of the grating device corresponding to both the first column of subpixels and the second column of subpixels is a light shielding region; after the first column of subpixels is updated to display the current frame image, update a region of the grating device only corresponding to the first column of subpixels into a light transmitting region, and meanwhile update and image displayed by the second column of subpixels;

after the image displayed by the second column of subpixels is completely updated, shade a light transmitting region of the grating device corresponding to both a third column of subpixels and a fourth column of subpixels and having the first predetermined width in such a way that a region of the grating device corresponding to both the third column of subpixels and the fourth column of subpixels is a light shielding region and an image display by the third column of subpixels is updated; after the image displayed by the third column of subpixels is completely updated, update a region of the grating device corresponding to both the second column of subpixels and the third column of subpixels and having the second predetermined width into a light transmitting region, and meanwhile update the image displayed by the fourth column of subpixels;

after the image displayed by the fourth column of subpixels is completely updated, shade a light transmitting region of the grating device corresponding to both a fifth column of subpixels and a sixth column of subpixels and having the first predetermined width so that a region of the grating device corresponding to the fifth column of subpixels and the sixth column of subpixels is a completely light shielding region, and meanwhile update an image displayed by the fifth column of subpixels; after the image displayed by the fifth column of subpixels is completely updated, update a region of the grating device corresponding to both the fourth column of subpixels and the fifth column of subpixels and having the second predetermined width into a light transmitting region, and meanwhile update an image displayed by the sixth column of subpixels; and so on, until a final column of subpixels are completely updated.

11. The 3D display control device according to claim 9, wherein the 3D display control unit is configured to: before a first column of subpixels is updated to display the current frame image, shade a light transmitting region of the grating device corresponding to the first column of subpixels in such a way that a region of the grating device corresponding to the first column of subpixels is a light shielding region; update an image displayed by the first column of subpixels; after the image displayed by the first column of subpixels is completely updated, shade a light transmitting region of the grating device corresponding to both a second column of subpixels and a third column of subpixels and having a second predetermined width, and meanwhile update an image displayed by the second column of subpixels; after the image displayed by the second column of subpixels is completely updated, update a region of the grating device corresponding to both the first column of subpixels and the second column of subpixels and having a first predetermined width into a light transmitting region, and meanwhile update an image displayed by the third column of subpixels;

after the image displayed by the third column of subpixels is completely updated, shade a light transmitting region of the grating device corresponding to both a fourth column of subpixels and a fifth column of subpixels and having the second predetermined width, and meanwhile update an image displayed by the fourth column of subpixels; after the image displayed by the fourth column of subpixels is completely updated, update a region of the grating device corresponding to both the third column of subpixels and the fourth column of subpixels and having the first predetermined width into a light transmitting region, and meanwhile update an image displayed by the fifth column of subpixels; in a similar fashion, until the final column of subpixels are completely updated.

12. The 3D display control device according to claim 8, wherein the grating device is a parallax barrier.

13. The 3D display control device according to claim 9, wherein the first predetermined width is equal to the second predetermined width.

14. The 3D display control device according to claim 9, wherein the first predetermined width is not equal to the second predetermined width.

\* \* \* \* \*